T. MIDGLEY.
TIRE BUILDING MACHINE.
APPLICATION FILED MAR. 6, 1915.

1,254,827.

Patented Jan. 29, 1918.
6 SHEETS—SHEET 1.

Witnesses:
Veronica Braun
S. G. Taylor

Inventor
Thomas Midgley
By his Attorney
Ernest Hopkinson

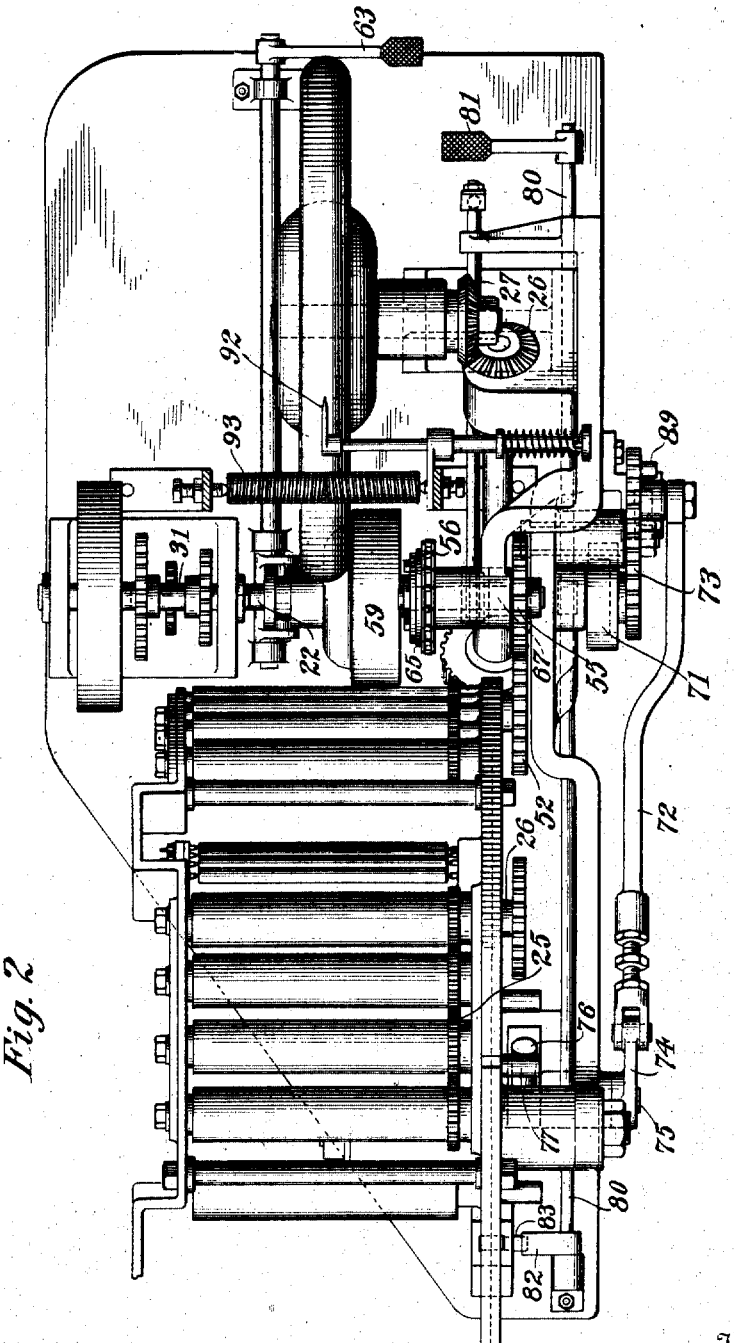

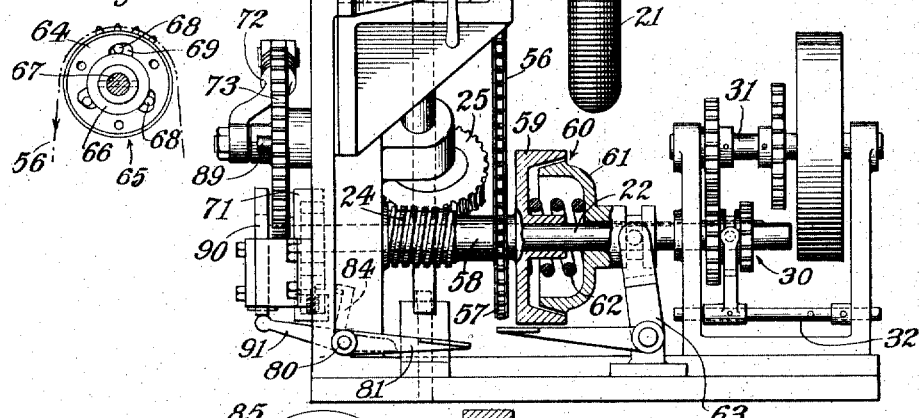

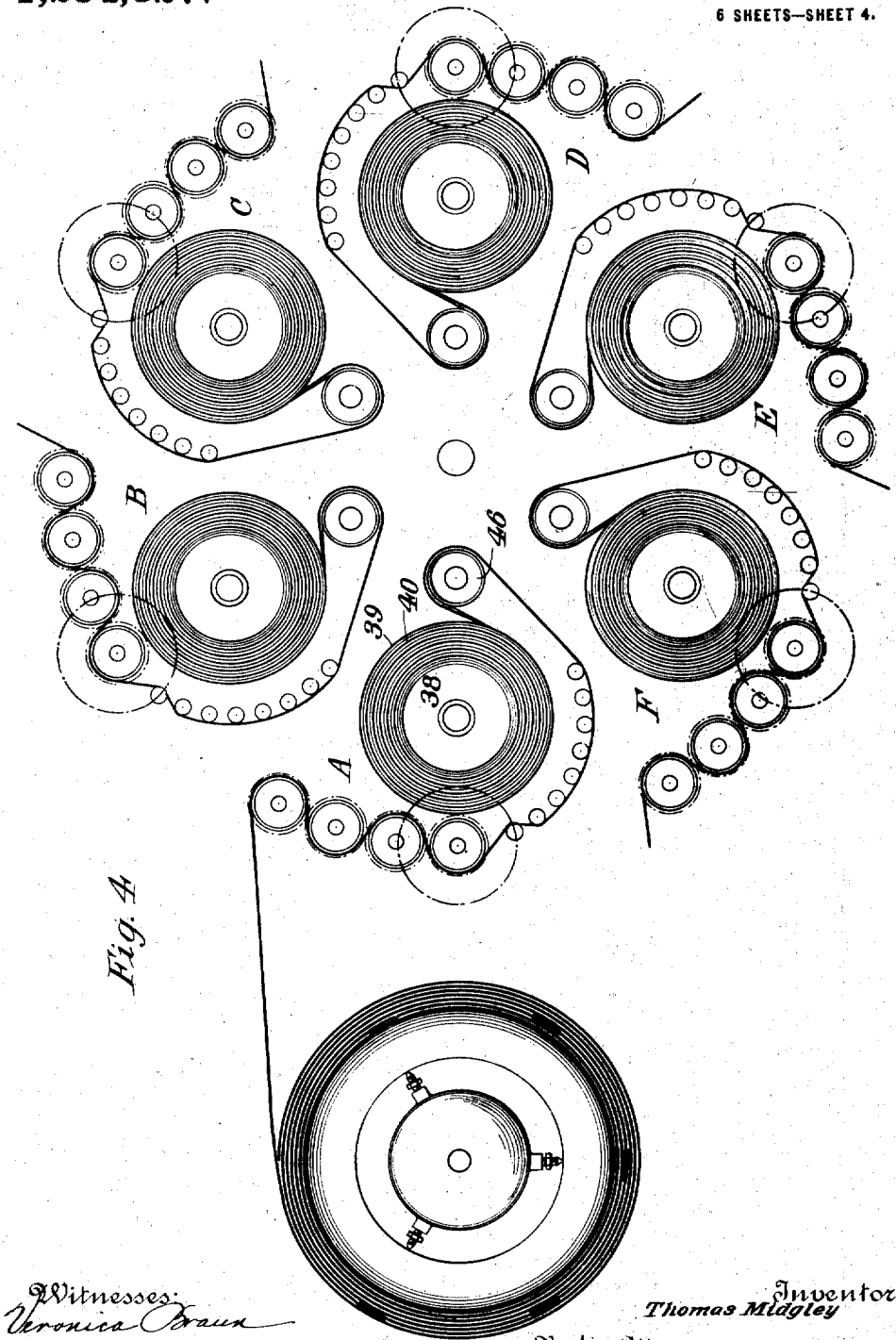

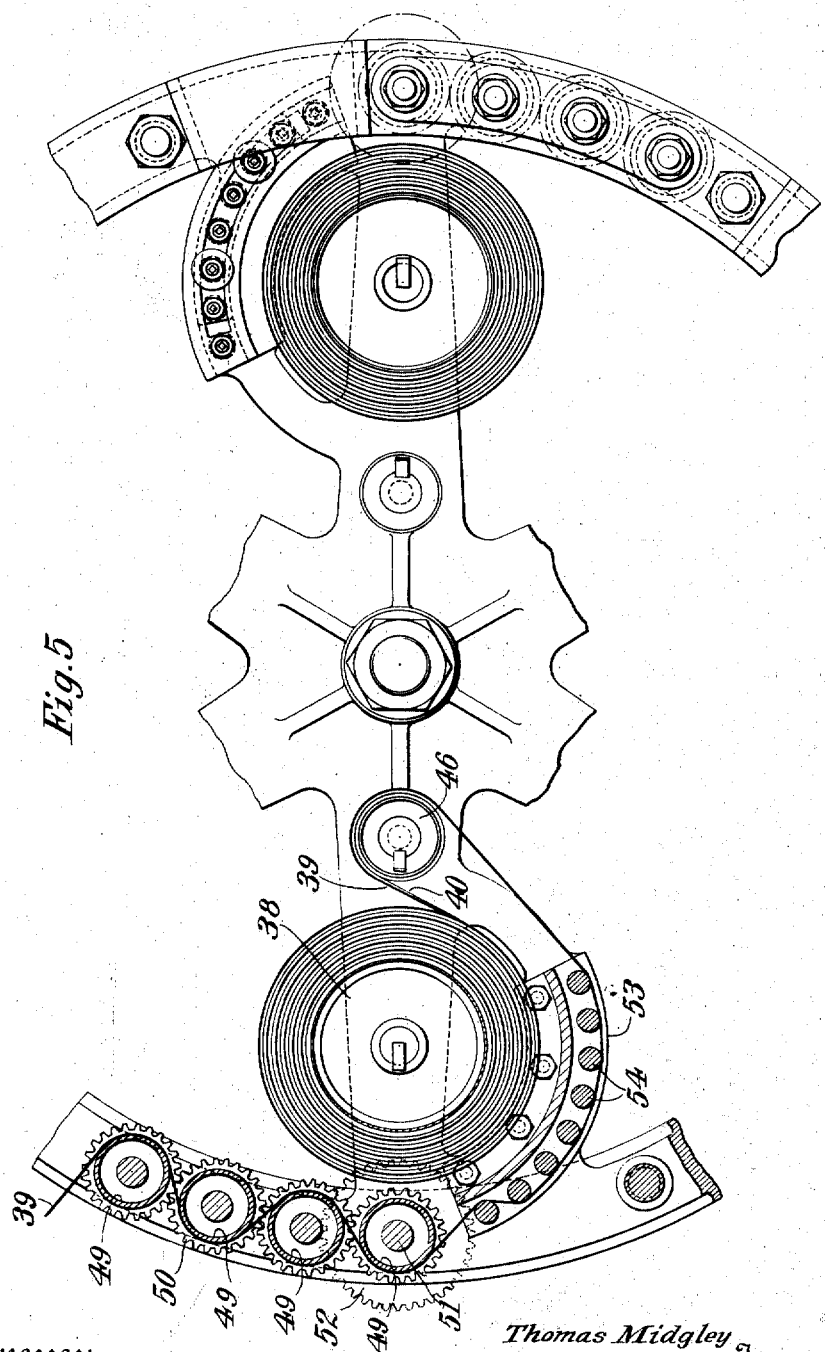

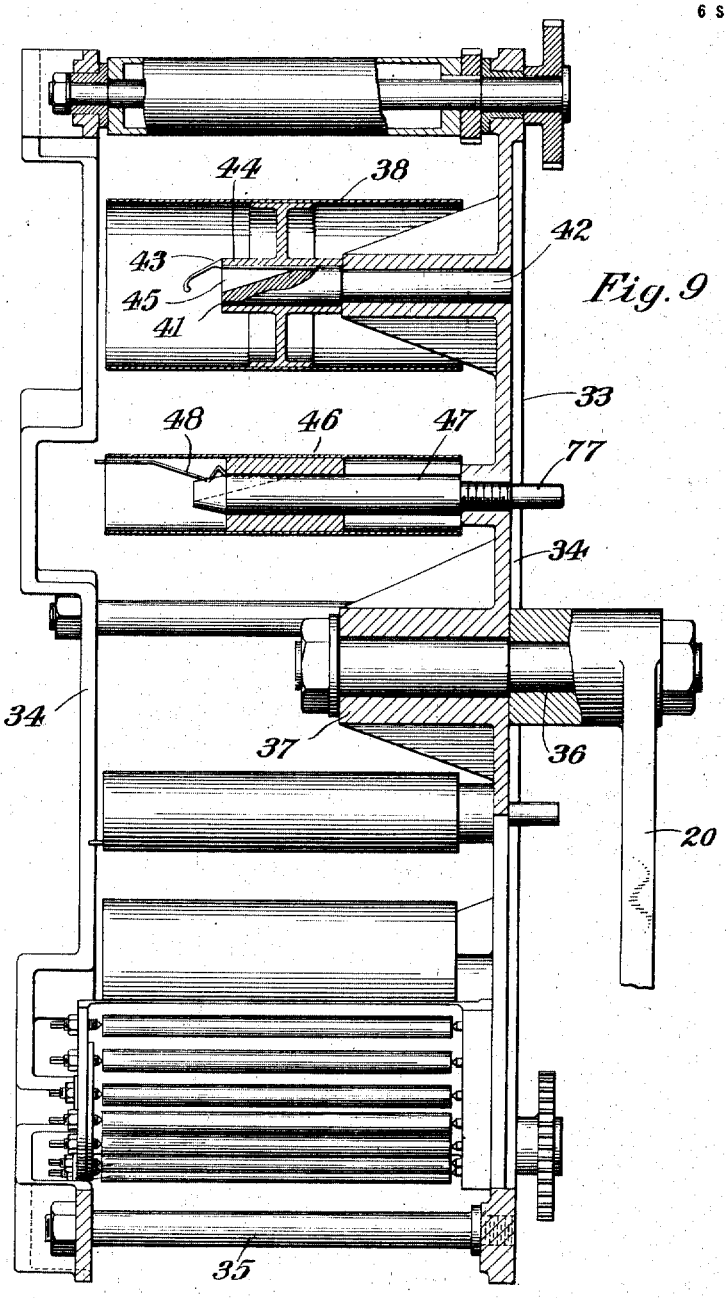

UNITED STATES PATENT OFFICE.

THOMAS MIDGLEY, OF LANCASTER, OHIO, ASSIGNOR TO MORGAN & WRIGHT, A CORPORATION OF MICHIGAN.

TIRE-BUILDING MACHINE.

1,254,827.  Specification of Letters Patent.  Patented Jan. 29, 1918.

Application filed March 6, 1915. Serial No. 12,537.

*To all whom it may concern:*

Be it known that I, THOMAS MIDGLEY, a citizen of the United States, residing at Lancaster, county of Fairfield, State of Ohio, have invented certain new and useful Improvements in Tire-Building Machines, of which the following is a full, clear, and exact description.

This invention relates to tire building machines and has for an object to provide a machine embodying coacting mechanism, whereby different widths of tire fabric, corresponding to respective plies that make up the tire, may be separately positively stretched to a predetermined degree and at the same time laid with great speed and accuracy upon a ring core.

A further object is to provide a machine embodying mechanism whereby the stretch imparted to the fabric is automatically controlled or confined to a predetermined amount.

A further object of the invention is to provide a machine embodying mechanism whereby the various feed rolls for the fabric are automatically positioned in succession for application of their respective widths of fabric to the ring core.

A further object is to provide a machine embodying mechanism whereby the various feed rolls are automatically connected for positive driving by the core driving mechanism as they arrive opposite the point where they are to be used.

With the above objects in view the invention consists in certain novel details of construction and combinations of parts hereinafter fully described and pointed out in the appended claims, it being understood that various modifications may be made without departing from the scope or sacrificing any of the advantages of the invention.

The invention will be readily understood from the following description taken in connection with the accompanying drawings in which, Figure 1 is a side elevation of a tire building machine embodying my improvements, with portions broken away;

Fig. 2 is a plan view of the parts shown in Fig. 1;

Fig. 3 is an end elevation with parts broken away;

Fig. 4 is a diagrammatic view showing the different units of stock rolls and feed rolls;

Fig. 5 is a fragmentary view, partly in elevation and partly in section showing two units of stock and feed rolls in detail;

Fig. 6 is a detail elevation of the core ratchet drive;

Fig. 7 is a sectional view of the parts shown in Fig. 6;

Fig. 8 is a detail view showing the turret stop mechanism;

Fig. 9 is a fragmentary plan view with parts in section;

Fig. 10 is a detail view showing the construction of a guide;

Fig. 11 is a detail sectional view of a ratchet clutch;

Fig. 12 is an elevation view of the parts shown in Fig. 11;

Fig. 13 is a detail view of another clutch;

Fig. 14 is a sectional view of the parts shown in Fig. 13.

Figure 1:
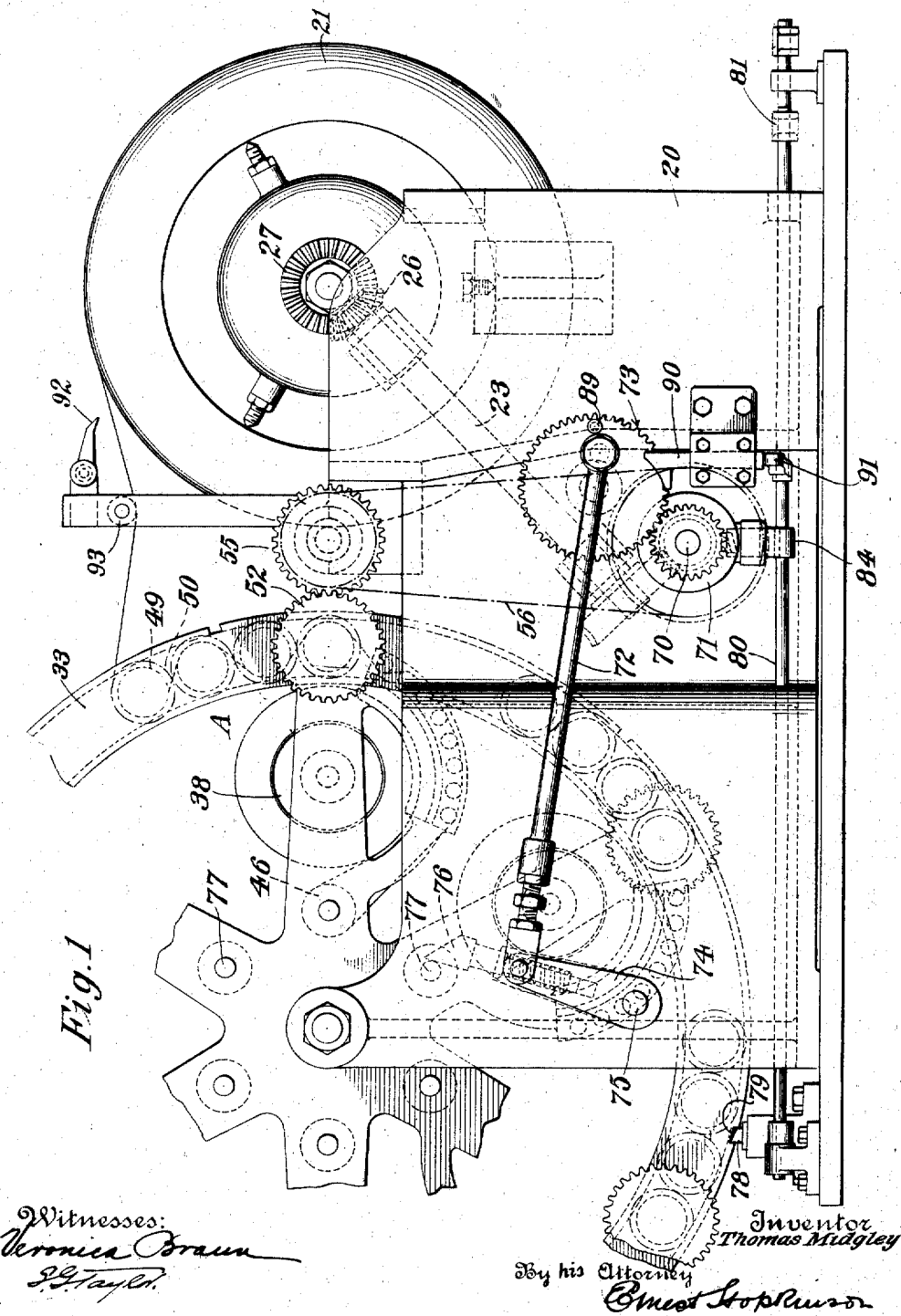

Referring now to the drawing 20 designates the frame of the machine, and mounted for rotation on the frame is a ring core 21 of the general configuration of the tire to be formed. A horizontally disposed main drive shaft 22 is journaled in the frame and drives the core 21 through the instrumentality of an obliquely disposed shaft 23 which has a worm and gear connection 24—25 with the main drive shaft, and a bevel gear connection 26—27 with the core spindle 28. The bevel gear 27 is equipped with a roller ratchet 29 which permits turning of the core by hand when the power drive is inactive. In order that the core may be given a fast rotation at times, and a slow rotation at other times, a two speed gear clutch, indicated in general by the numeral 30, connects the main drive shaft with the pulley shaft 31, as shown in Fig. 3, the clutch being shifted by a lever mechanism 32, to its high, low, or inactive positions, as desired.

Mounted for step rotation in the plane of the core is a turret indicated in general by the numeral 33, the same preferably comprising annular spoked sides 34 connected at intervals by spacing bolts 35. The turret turns freely on a horizontal stub shaft 36 which is secured to the frame 20 and is loosely mounted in a hub 37 formed on one of the annular sides of the turret. The axis of the core and the axis of the turret, that is, the spindle 28 and the shaft 36, are preferably disposed in the same horizontal plane.

The turret carries a plurality of stock rolls for respective different widths of fabric that make up respective plies of the tire, and respective feed rolls in unit association therewith, as shown at A, B, C, D, E and F in Fig. 4, and as these units are duplicates of each other, a description of one unit will suffice for all.

As shown best in Fig. 5 each unit comprises a roll 38 upon which is wound the rubber treated bias cut fabric strip 39 from which a corresponding ply of the tire is to be made, together with an interposed liner strip 40 which keeps the successive convolutions of fabric from sticking together while on the roll. The roll is feathered as shown at 41 in Fig. 9 on a stub shaft 42 that is journaled in one of the spokes of the turret, and is mounted for application and removal from the shaft by means of a spring latch 43 carried longitudinally of the shaft and hooking over the end of the hub 44 of the roll, the shaft having a recess 45 underneath the latch to permit of the latch being depressed for releasing the roll.

The liner strip comes off the roll with the fabric strip, and for separating this liner strip from the fabric strip and reeling it for future use, a take up roll 46 for the liner strip is rotatably mounted on a stub shaft 47 secured to said spoke between the hub of the turret and the stock roll, the take up roll being removably confined on the shaft by a spring latch 48 similar to the spring latch above described. The fabric strip backed by the liner strip is drawn over the take up roll and rotates the latter by frictional engagement therewith, the liner strip being there separated from the fabric strip and accumulating upon the take up roll.

The rubber treated fabric 39 freed from the liner strip, is fed to the core by a train of feed rolls 49 of equal diameter, as best shown in Fig. 5, these rolls being journaled in the annular rim of the turret and being geared together as shown at 50 for simultaneous uniform surface speed. The first roll of the train of feed rolls is disposed with its axis in the plane of the axes of the stock roll and the take up roll, and forms the driving roll for the train, and for this purpose the shaft 51 of this feed roll is extended beyond the side of the turret and there equipped with a gear 52 adapted to be driven by mechanism hereinafter described as the unit comes opposite the point where the fabric is to be used. On the way to the feed rolls the fabric strip passes over the arcuate guide member designated in general by the numeral 53, and embodying parallel idler rolls 54, as shown in detail, Fig. 10, the fabric passing under the last roll of the series and thereby being retarded against too fast travel.

It is desirable that the fabric be stretched along its medial longitudinal portion as it passes on to the core, and to accomplish this the feed rolls are positively driven from the main drive shaft 22 at such a ratio of surface travel relatively to the surface travel of the core that the feed rolls deliver the fabric slower than it is taken on by the rotating core. The preferred mechanism used in this connection includes a single drive gear 55 positioned on the frame 20 to successively roll into mesh with the above described driving gears 52 of the units A to F inclusive at successive step movements of the turret, it being understood that the turret is locked stationary while the fabric of any unit is being wound on to the core. The gear is driven by a chain drive 56 from a sprocket 57 on the main drive shaft. The sprocket 57, chain drive 56, gears 55 and 52, as well as the gear train 50 of the feed rolls, are so proportioned that the surface speed of the feed rolls is preferably about fourteen per cent. less than the surface speed of the ring core. Therefore the fabric will be stretched as it passes from the feed rolls on to the core to a corresponding degree, namely fourteen per cent., it being understood that the longitudinal central portion of the strip alone is stretched. The rolls of the units for successive plies of fabric increase in diameter to maintain a constant stretch for the different plies as the carcass grows in diameter.

To permit of the core being driven while the fabric supplying mechanism is at rest, as is necessary when stitching down the fabric on the sides of the ring core, or against underlying layers, the hub 58 of the sprocket 57 is formed integral with the loose member 59 of the clutch 60, the feathered member 61 of which is normally held in inactive position by a spring 62 whereby the chain drive will remain quiescent while the ring core is being driven independently during the stitching operation. A pedal 63 provides means for shifting the feathered member of the clutch to lock the sprocket for rotation by the main drive shaft when it is desired to supply a round of fabric to the core.

In order to control or confine the stretch of the fabric to a predetermined amount the chain drive 56 meches with a sprocket 64 which forms the loose member of a roller clutch 65, the fixed member 66 of which is fixed to the shaft 67 of the above described common drive gear 55. The fixed member has peripheral pockets which house rollers 68, the pockets having sloped bottom faces 69 as shown. When there is no tension on the fabric strip the sprocket 64 slips on the fixed member 66, but when the tension on the fabric strip, acting on the gears 50, 52, 55 through the rolls 49, tends to turn the fixed member faster than the sprocket, the rollers 68 run into the shallow ends of the pockets and lock the sprocket and fixed member together, with the result that a positive predetermined stretch of fourteen per cent. is imparted to the fabric strip as it passes from the feed rolls on to the core.

The above described means for controlling the stretch of the fabric also assists in properly "spotting" the fabric on the core, that is, it enables the operator to so start the fabric sheet for a new ply on the core that the lap joint of the previously laid ply will not be directly underneath it. When the machine is started so that the core and feed rolls are coupled for simultaneous rotation, the feed rolls at first will not move, due to there being no tension on the fabric strip to lock the clutch. Thus the operator is enabled to pull the fabric strip taut from the final feed roll thereby locking the clutch to feed out the fabric under fourteen per cent. stretch, and should the operator see that the lap joint of the previously laid ply will come underneath the spot where the new ply will be begun, he may slacken the fabric strip thereby stopping the feed of the fabric until said lap joint has passed by, whereupon he may again tension the sheet of fabric to start the positive feed thereof and place the end of the strip on the previously laid ply at the proper place in rear of the lap joint of the ply, so that the lap joint of the new ply will not be too near the lap joint of said previously laid ply.

For advancing the turret step by step to present the units in succession at the point where their fabric is to be used, a shaft 70 is coupled to the main drive shaft 22 by a clutch 71. The shaft 70 drives a pitman 72 slowly through the instrumentality of a reduction train of gears 73 so timed that the shaft makes three revolutions to advance and return the pitman. The pitman is connected to one leg of a U-shaped rock lever 74 which is journaled in the frame 20 as shown at 75. The other leg of the lever is equipped with a spring pressed tip 76 which normally rests in rear of one of a series of outstanding equally spaced lugs 77 on the turret, these lugs corresponding in number to the number of the units A to F inclusive. During forward movement of the pitman the lever pushes forward on the lug thereby advancing the turret one step, and during return movement of the pitman the spring pressed tip of the lever underrides the lug and comes to rest in rear of the next succeeding lug.

At the end of each step movement the turret is locked stationary, this occurring simultaneously with the arrival of the driving gear 52 of any particular unit into mesh with the common drive gear 55 of all the units. The locking mechanism includes a spring pressed stop 78 which is disposed underneath the turret and springs into one of a series of peripheral notches 79 in the turret at the end of each step movement of the turret, these notches corresponding in number to the number of the units. A rock rod 80 forms means for releasing the stop, the rod being equipped with a pedal 81 and with a finger 82 which presses down upon a lug 83 formed integral with the stop and thereby withdraws the stop when the pedal is depressed. This rod is also equipped with an upstanding arm 84 which throws the clutch 71 into active position, as will be hereinafter more fully described, simultaneously with the release of the stop 78 so that the turret may make a step advance.

The above mentioned clutch 71 comprises a member 85 fixed to the main drive shaft 22 and provided at opposite points with teeth 86, and a member 87 fixed to the shaft 70 but loose on the member 85. The member 87 carries a spring pressed pawl 88 which normally is held withdrawn into the member by the above mentioned upstanding arm 84, but which upon disengagement of the arm springs up and lodges against one of the advancing teeth 86 thereby locking the shaft 70 and shaft 22 for rotation together.

To automatically release the clutch 71 just before the pitman reaches its limit of rearward movement and thereby prevent the pitman being started upon its forward or working stroke, an automatic throw off is provided, the same comprising a lug 89 on the pitman gear and a slide bar 90 carried by the frame 20, this slide bar being supported in upright position upon a lever arm 91 carried by the rock rod 80. The lug 89 rides upon and depresses the slide bar on the last quarter of the single revolution made by the pitman gear thereby rocking the rod to move the arm 84 inwardly and throw off the clutch.

Th machine is equipped with a guide finger 92 that is supported above the central line of the strip of fabric as it passes from the corresponding feed rolls to the core. This guide assists the operator in keeping the fabric strip centralized as it passes on to the core, the operator taking care that the center line, which is customarily marked on the fabric prior to its being reeled on the stock roll, passes continuously exactly underneath the guide.

For smoothing out any longitudinal wrinkles that may exist in the fabric strips, a smoothing roller 93 is positioned on the frame to bear upon the fabric as it passes from the corresponding feed rolls to the ring core, this roller being threaded right handed for one half its length and left handed for the other half, these threads serving to stretch the fabric transversely somewhat and thus positively smooth out wrinkles.

The operation of the machine is as follows:

Suppose the machine to be started by throwing in the low side of the clutch 30 to rotate the core slowly. The operator then depresses the pedal 81 and holds it down. The clutch 65 is thereby thrown into active position, and the stop 78 simultaneously released whereby the turret is moved one step and positions the unit A with the material for the initial layer of the tire in position for driving by the gear 55. The operator releases the pedal just before the turret has completed its step so that the clutch 30 is thrown off and the stop 78 permitted to ride into the notch 79 of the turret that corresponds to the unit A so that the turret is locked stationary at the end of its step movement. The parts of the machine will then be in the position shown in Fig. 1.

The operator depresses the pedal 63 whereby the feed rolls of the unit A are coupled for rotation with the core but do not immediately start feeding the fabric strip due to there being no tension on the strip for locking the ratchet clutch 65. The operator now pulls firmly on the end of the fabric strip thereby locking the clutch 65 so that the fabric strip is fed positively under fourteen per cent. stretch toward the core, the operator then pressing the end of the strip on to the core to which it adheres.

The crown of the revolving core draws a round of the fabric on to it and at the completion of this the clutches 60 and 30 are thrown off to stop the machine. The fabric strip is then cut from the unit and a lap joint made in the usual manner. The high side of the clutch 30 is then thrown in to revolve the core fast while the fabric is being stitched against the sides of the core with the usual or preferred tools used for this purpose.
This completes the laying of the first ply. The above described operation is repeated until the turret has made a complete cycle and a round of fabric from each of the units supplied successively in superposed relation upon the core.

Having described my invention, what I claim and desire to have protected by Letters Patent is:

1. A tire building machine embodying a ring core, means for driving the same, feed rolls for respective different widths of fabric, means for successively positioning the feed rolls for application of their fabric to the core, and means operatively connecting the feed rolls for positive driving by the core driving means as they arrive opposite the point where they are to be used.

2. A tire building machine embodying a ring core, means for driving the same, feed rolls for respective different widths of fabric, means for successively positioning the rolls for application of their fabric to the core, respective drive shafts for said feed rolls, and a coupling operatively connecting each drive shaft with the core driving means as the corresponding feed roll arrives at the point where it is to be used.

3. A tire building machine embodying a ring core, means for driving the same, feed rolls for respective different widths of fabric, means for successively positioning the rolls for application of their fabric to the core, respective drive shafts for the feed rolls, a single coupling for connecting each drive shaft with the core driving means, and a clutch operatively connected with the coupling and automatically moved to active position when a predetermined tension comes upon the fabric.

4. A tire building machine embodying a frame, a turret rotatively mounted on the frame, feed rolls for respective different widths of fabric disposed in spaced relation on the turret, driven shafts carried by the turret for rotating respective feed rolls, a driving means on the frame positioned to operatively engage the driven shafts successively, a ring core on the frame, means for driving the ring core, and means for positively driving the drive shaft from the core driving means.

5. A tire building machine embodying a frame, a step rotated turret thereon, feed rolls on the turret for respective different widths of tire fabric, driven shafts on the turret for respective feed rolls, a drive shaft on the frame positioned to operatively engage the driven shafts successively, means for imparting a step rotation to the turret, means for locking the turret stationary upon engagement of any particular driven shaft with the drive shaft, a ring core on the frame, means for driving the ring core, and means for positively driving said drive shaft from the ring core driving means.

6. A tire building machine embodying a power-driven ring core, stock rolls for carrying sheeted tire material of different widths, feed rolls geared together for delivering the material from the stock roll in a circuitous path to the ring core, means for successively positioning the feed rolls for application of their fabric to the core, a drive shaft geared to the feed rolls for rotating the feed rolls, means for driving the ring core, and means for positively driving said drive shaft from said core driving means.

Signed at Lancaster, Ohio, this 1st day of March, 1915.

THOMAS MIDGLEY.

Witnesses:
G. A. STEPHENSON,
H. B. CARPENTER.

Copies of this patent may be obtained for five cents each, by addressing the "Commissioner of Patents, Washington, D. C."